Figure 1:
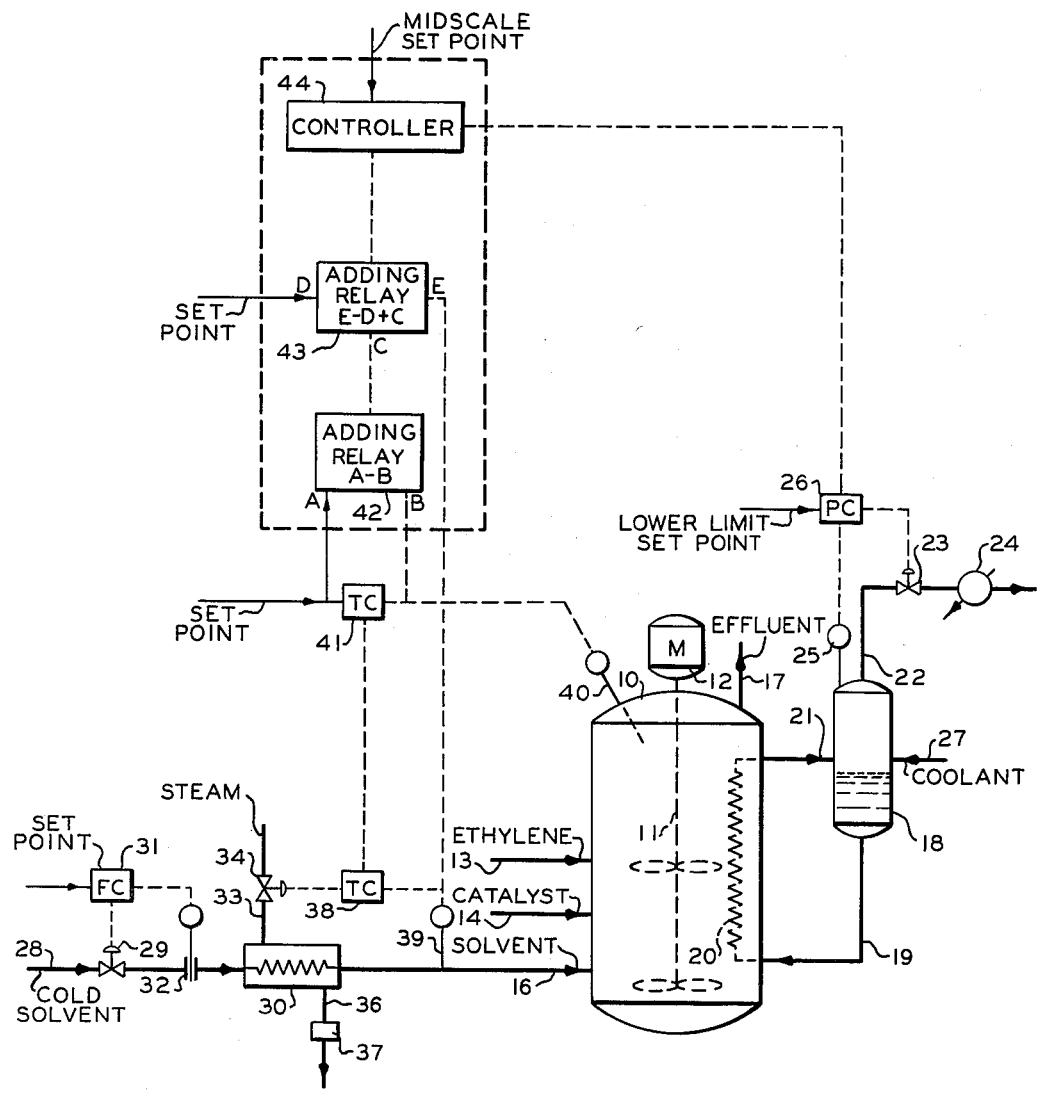

INVENTORS
D. E. BERGER
L. W. MORGAN

United States Patent Office 3,254,071
Patented May 31, 1966

3,254,071
PROCESS AND APPARATUS FOR CONTROLLING POLYMERIZATION REACTION TEMPERATURES
Lyman W. Morgan, Golden, Colo., and Donald E. Berger, Bartlesville, Okla., assignors to Phillips Petroleum Company, a corporation of Delaware
Filed Aug. 28, 1959, Ser. No. 836,647
6 Claims. (Cl. 260—94.9)

This invention relates to a method of controlling a process variable which is directly affected by two other independently controllable variables. In one of its more specific aspects this invention relates to a method of controlling the temperature of a polymerization reaction by manipulation of coolant and diluent temperatures. In still another aspect it relates to apparatus suitable for maintaining such a control.

Many processes have one or more variables which can be directly affected by two other independently controllable variables and normally a choice must be made as to which of the two variables will be used to control the third. An example of such a process is the blending of two streams containing components A and B respectively to produce a third stream containing a given ratio of A to B. Streams of A and B can be metered into a mixing T with one stream at constant flow and the flow of the other stream controlled in response to an analysis of the mixture. Another example is the temperature control of a continuous reaction. The temperature of the reaction can be regulated by controlling the temperature of either the feed materials or a heat exchange medium. Such a situation exists in the catalytic polymerization of 1-olefins in a reaction diluent as described in the patent to Hogan et al., U.S. 2,825,721. This reaction is exothermic and heat can be removed with coolant in the reactor jacket and/or coils or by cooling the diluent feed. It has been considered advantageous to use both variables (coolant and diluent temperatures) to control reactor temperature but a suitable automatic control method for doing this has not been available. When the reactor temperature recorder controller was cascaded to the set points of both the coolant and diluent temperature controllers, it was observed that the diluent temperature made its full contribution to temperature regulation and was either at the top or bottom of its range most of the time.

We have invented a control method and system which enables improved control over a process variable by the simultaneous manipulation of two other independently controllable variables. Our invention is especially valuable when said process variable is more sensitive to one of said controllable variables than to the other. According to our invention a process variable X is maintained substantially at a given value X' when X is sensitive to independently controllable variables M and N by sensing variable X, producing a change in variable M to correct variable X in response to a deviation of X from X', sensing variable M, establishing a mid-range value M' for variable M, producing a potential representative of the sum of deviations of X from X' and of M from M', and simultaneously producing a change in variable N to correct both variables X and M in response to said potential. In a polymerization system, such as discussed above, including a reactor, a coolant in indirect heat exchange with the reactor contents, means for varying coolant temperature, and means for varying the temperature of diluent continuously fed into said reactor, our invention comprises the combination of first means for sensing diluent temperature, a first controller connected to said first means and said means for varying diluent temperature, second means for sensing reactor temperature, a second controller connected to said second means and said first controller, means for producing a potential proportional to the sum of a desired reactor temperature less actual reactor temperature plus actual diluent temperature less a desired diluent temperature, and a third controller connected to said potential producing means and said means for varying coolant temperature.

It is an object of our invention to provide a method of controlling a process variable by the simultaneous manipulation of two other independently controllable variables.

Another object is to provide an improved automatic control system suitable for controlling the temperature of an exothermic polymerization reaction by varying coolant and diluent temperatures.

Another object is to control a polymerization reaction in such a manner that either heating or cooling as necessary to maintain the reaction temperature substantially constant can be effected very rapidly.

Still another object is to provide a control method which utilizes to advantage two independent variables to control a third which is more sensitive to one of said independent variables than to the other.

Figure 2:
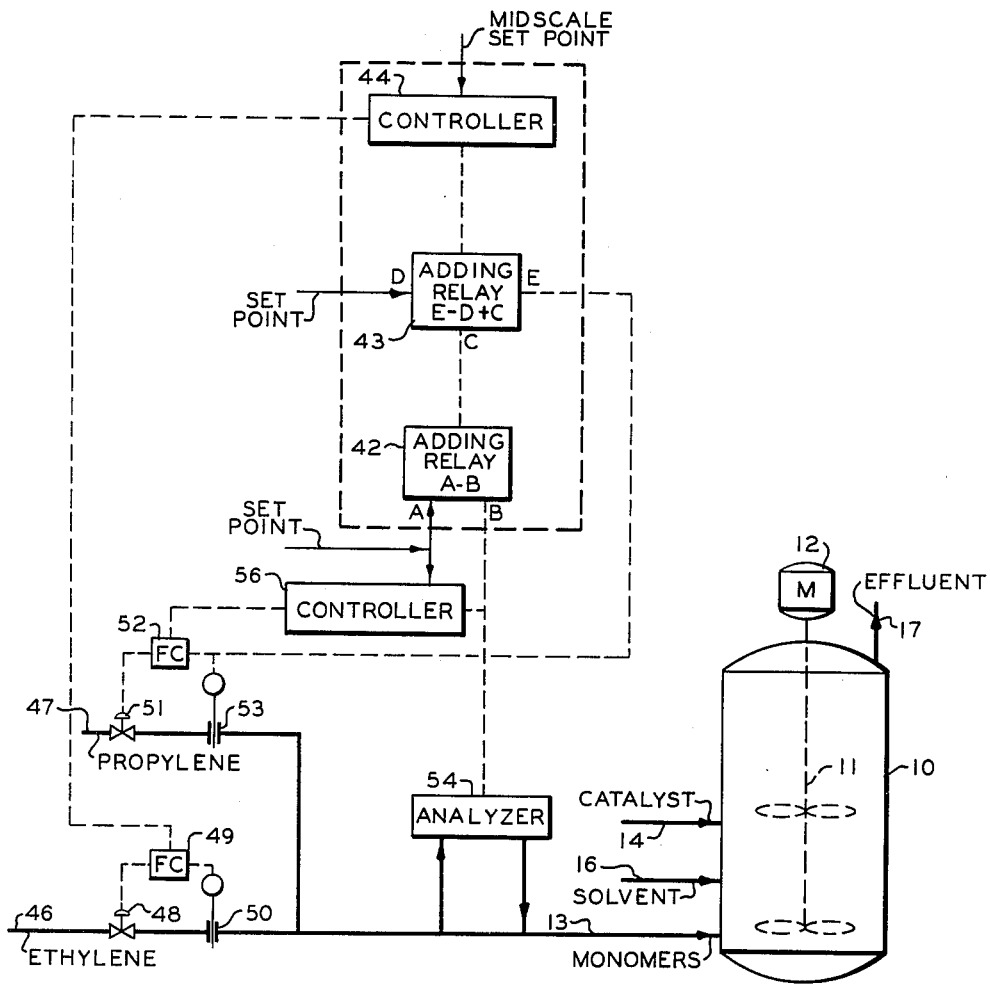

Other objects, advantages and features of our invention will be apparent to those skilled in the art from the following discussion and drawings in which:

FIGURE 1 is a schematic diagram of a polymerization process using our invention to control reactor temperature, and FIGURE 2 is a schematic diagram of a polymerization process using our invention to control the blending of monomer feed streams.

While our invention is described primarily in regard to control of polymerization reactions, it will be readily apparent to those skilled in the art that other applications of our control scheme can be made in other processes such as in blending, crystallization, fractionation, and the like. Our control method is uniquely well suited for polymerization because of the desirability in this process of maintaining a substantially constant reaction temperature and also because reaction temperature can be made to respond more quickly to variations in diluent temperature than to similar variations in coolant temperature. In other words, both the temperature of the coolant and diluent can be manipulated so that desired quick adjustments in reaction temperature can be made by utilizing the diluent while forcing the total change in thermal duty to be switched to coolant and thus return diluent temperature to a mid-range where it can again be used for rapid adjustments in reaction temperature.

A better understanding of our invention can be had by reference to the drawings in which FIGURE 1 is a schematic diagram showing the control of solvent and coolant temperatures in the manner of our invention to maintain a substantially constant reactor temperature. In FIGURE 1 a conventional polymerization reactor 10 is provided with an agitator 11 driven by a motor 12. Ethylene, catalyst and solvent are continuously introduced into reactor 10 through lines 13, 14 and 16, respectively. Effluent is continuously withdrawn from the reactor through line 17.

The temperature within the reactor is adjusted by circulating a coolant from vessel 18 through line 19 and coils 20, returning the coolant to vessel 18 through line 21. The heat exchange surfaces are represented diagrammatically in this drawing as coils 20 although a jacket on the reactor is normally used in addition to the internal cooling coils. The temperature of the coolant can be regulated by any suitable means but we prefer to use a boiling coolant to reduce the film coefficient and so that coolant temperature will remain substantially the same throughout the heat exchange area of the reactor. In this case the coolant is maintained at its boiling temperature by regulating the pressure in vessel 18. Vapors from vessel 18 are vented overhead through line 22, passing through motor valve 23 to condenser 24. The setting of motor valve 23 is controlled by pressure controller 26 which is operatively connected to vessel 18 through pressure transmitter 25 to sense the pressure in the vessel and produce the necessary change in the setting of valve 23 so that the pressure in vessel 18 is maintained substantially constant at a set value. Controller 26 has a lower limit to keep the pressure in vessel 18 above atmospheric. Makeup coolant is introduced to vessel 18 through line 27. Preferably the coolant is a hydrocarbon of the same type as is employed for the reaction solvent, for example, n-pentane, hexane, cyclohexane, methylcyclohexane, n-octane, dodecane, and the like.

The temperature in the reactor is also regulated by manipulation of the solvent temperature. Cold solvent which is considerably below the temperature desired in reactor 10 is passed through line 28 and motor valve 29 into heater 30. The flow of solvent is maintained substantially constant by flow recorder controller 31 operatively connected to motor valve 29 and to orifice 32 in line 28. Heat is supplied to heater 30 by steam introduced through line 33, the rate of steam being controlled by motor valve 34. Condensate leaves the heater through line 36 and trap 37. By using cold solvent which is steam heated in this manner the temperature of the solvent can be accurately and quickly regulated by temperature recorder controller 38 operatively connected to motor valve 34 in the steam line and to temperature sensing element 39 in line 16. Controller 38 receives its desired solvent temperature from controller 41. Generally this set point is above the temperature of the cold solvent entering in line 28. The amount of steam introduced into heater 30 is thus regulated to maintain the solvent at this manipulated temperature set point.

Operating according to our invention, the reactor temperature is detected by sensing element 40 in reactor 10 and a signal proportional to this temperature is transmitted to temperature recorder controller 41. Controller 41 produces an output signal which is a function of the deviation of the reactor temperature from a predetermined value which is the set point for controller 41. Thus, controller 41 is cascaded to controller 38 manipulating the set point of controller 38 so that the solvent temperature is adjusted as required to maintain the reactor temperature at a substantially constant value.

Simultaneously the temperature signal from sensing element 40 is sent to adding relay 42, this signal represented here by the letter B. Adding relay also receives an established potential A which is representative of the set point of controller 41, that is, the desired temperature of the reactor. A potential C is thus produced in relay 42 as the difference between potentials A minus B and this potential C is transmitted to relay 43.

The temperature signal from sensing element 39 in solvent line 16 is likewise transmitted to relay 43 as well as an established potential representative of desired constant value for the solvent temperature. The potential proportional to solvent temperature is represented by the letter E and the set point potential for the solvent is represented by the letter D. Adding relay 43 subtracts potential D from the sum of potentials E and C and produces another potential proportional to the result, this potential being transmitted to controller 44. It can be seen, therefore, that as long as either the reactor or solvent temperatures deviate from their established set points a signal will be transmitted to controll 44 displacing it from its mid-scale set point. Controller 44, therefore, sends a control signal derived from the combined deviations of temperature in both the reactor and the solvent and transmits this signal to controller 26, manipulating the set point thereof accordingly to adjust the pressure in vessel 18 as required to change coolant boiling temperature so that both the reactor and solvent temperatures are readjusted to their desired values.

Since the coolant temperature has been adjusted for reactor temperature deviation and also for solvent temperature deviation, this double adjustment is more than that required to return the reactor temperature alone to its normal set point. It is this double adjustment or over-compensation of the coolant temperature that permits the solvent temperature to return to its normal set point. Also, since the two corrections are made simultaneously, the reactor temperature is returned to its desired value very rapidly.

The scheme shown in FIGURE 1 and discussed above is preferred because the solvent temperature can quickly adjust the reactor temperature to its desired value. This is particularly true when the reactor temperature tends to drop below its desired value. Since in the absence of manipulation of solvent temperature the only heat source for the reactor is the heat of reaction itself, there is necessarily considerable time lag between a deviation in reactor temperature and the adjustment to correct this deviation by changing coolant pressure. The large reacting mass plus the reactor itself must be heated before the temperature is returned to normal even though the temperature of the coolant is increased by increasing the pressure thereon. According to our invention this required heating is performed more quickly by the incoming solvent which increases in temperature in order to correct reactor temperature. Even though reactor temperature is corrected, however, the deviation in solvent temperature forces the net change to be made by the pressure on the coolant so that the solvent temperature again returns to its normal or "mid-range" value and is again ready for an emergency adjustment in reactor temperature. The lower limit set point of pressure controller 26 prevents the coolant temperature from becoming too low while correcting for the combined deviations in solvent and reactor temperature.

It is within the scope of our invention to reverse the controls as shown in FIGURE 1 so that the temperature of the coolant is maintained substantially constant and the net change required to adjust reactor temperature is made by an adjustment in the temperature of solvent being introduced to the reactor. One advantage of this arrangement is in maintaining the coolant temperature constant in order to produce a more uniform polymer. Higher molecular weight polymer tends to be formed near the cooling surfaces in the reactor where the temperature is slightly lower than in the remainder of the reactor. Lower coolant temperatures promote this formation of heavy polymer.

Our invention can also be utilized to advantage in controlling the blending of two streams. This is illustrated in FIGURE 2 in relation to a polymerization reaction wherein ethylene and propylene are blended in a desired ratio to produce a given copolymer in the reactor. Our invention is especially useful when combining a liqud propylene or butylene stream with a gaseous ethylene stream. In this embodiment ethylene in line 46 and propylene in line 47 are blended in line 13 and introduced into reactor 10. Generally the ethylene stream will contain a small amount of propylene and the propylene stream will contain a small amount of ethylene so that to control the ratios of these two monomers in the combined stream it is desirable to analyze for one of the components and adjust the flow rate of one of the monomer streams accordingly. As shown in FIGURE 2, the flow of ethylene through line 46 is controlled by motor valve 48 which is connected to flow recorder controller 49 also operatively connected to orifice 50. The flow of ethylene is thus maintained at a substantially constant value established by the set point of controller 49. The flow of propylene through line 47 is controlled in a similar manner by motor valve 51 and controller 52 connected to valve 51 and orifice 53.

The combined monomer stream in line 13 is continuously sampled and analyzed by analyzer 54 which can analyze for the propylene and/or ethylene concentration. This instrument can be an infrared analyzer, process chromatograph, mass spectrometer, an analyzer as described in U.S. 2,579,825 to Hutchins, or some similar analytical instrument which is well known in the art. Ordinarily it is desirable to analyze for component present in the smaller amount. In this case the percentage of propylene is small in relation to the percentage of ethylene and the analysis is for propylene. A signal proportional to the propylene concentration is transmitted from analyzer 54 to controller 56 which is provided with a set point representative of the desired propylene content of stream 13. Controller 56 then manipulates the set point of controller 52 to correct for the deviation in propylene content from the desired value.

In a manner similar to that described in FIGURE 1 potentials A and B are transmitted to relay 42, potential A being representative of the set point of controller 56 for the desired propylene content in stream 13 and potential B representing the actual propylene content in stream 13. Potential C which is A minus B is transmitted to adding relay 43 which likewise receives as inputs the desired flow D of propylene through line 47 and the actual flow E as sensed through orifice 53. An output potential from relay 43 equal to E minus D plus C is transmitted to controller 44 which has a mid-scale set point. A signal proportional to the sum of the deviations of the propylene content of stream 13 and flow rate of propylene through line 47 is transmitted to controller 49 manipulating the set point thereof and causing an adjustment to be made in ethylene flow rate so that a full correction is thereby made returning the propylene flow rate to its desired value and making the desired correction in propylene content of stream 13.

To further illustrate our invention in this embodiment it is assumed that ethylene and propylene are to be blended in a 95/5 weight percent ratio and fed to reactor 10. Since the ethylene contains a small variable amount of propylene in line 46 it is necessary to make continuous adjustments in the flow rates of the individual monomer streams in order to maintain the desired monomer ratio in the mixture. Assuming that the propylene content of the mixture tends to increase above the desired value, this increase will be detected by analyzer 54 which transmits a signal accordingly to controller 56 and controller 52 is reset to decrease the propylene flow rate through line 47. Since propylene is present in the mixture in the smaller amount a change in the propylene flow rate rapidly affects the ratio of propylene to ethylene in the mixture. Simultaneously, however, controller 44 in conjunction with relays 42 and 43 produces a potential which is proportional to the sum of the errors of the desired propylene concentration minus the actual concentration in the mixture plus the actual propylene flow rate minus the desired propylene flow rate. Controller 49 is reset to compensate for both of these errors by adjusting the ethylene flow rate upwardly so that the total adjustment is made by changing the ethylene flow rate and the propylene flow rate is again returned to its desired mid-range value so that it is again ready to make a change which may be called for by further discrepancies in the monomer ratio in stream 13. Since the signal transmitted to controller 49 is proportional to the sum of the errors in stream composition and propylene flow rate the desired correction in ethylene flow rate is made much more rapidly than if a signal proportional to either one of said errors was transmitted to controller 49.

Again, as pointed out in regard to FIGURE 1, our invention can be applied by reversing the controls so that the ethylene feed rate is maintained substantially constant while the propylene flow rate is forced to make the full adjustment necessary. This arrangement would be desirable when propylene is present in a small amount and the total monomer flow rate should not change appreciably. Thus the flows of both streams are manipulated to correct a ratio error quickly while the full correction is ultimately made by the propylene flow, thus changing the total monomer flow relatively little.

The individual control instruments which are employed by our invention are themselves conventional and well known in the art. Our invention lies in the manner in which these instruments are employed and connected to receive the specific signals of the process as described. For example, the transducers and controllers are conventional, a number of these instruments being described in the I.S.A. Journal, volume 6, No. 1, pp. 44–79, January 1959. The instruments can be either electronic or in the I.S.A. Journal, volume 6, No. 1, pp. 44–79, January 1959. The instruments can be either electronic or pneumatic. The adding relay 42 can be a Foxboro type M/56–3 adding relay and relay 43 can be a Foxboro type M//56–1 adding relay. Controller 44 can be a Foxboro model 58P4 blind controller for control of the sum of the two errors to a mid-scale zero. The above Foxboro controller and relays are pneumatic instruments but electronic instruments could be used as well. Descriptions of computers which could be used for relays 42 and 43 can be found in the applications manual for Philbrick Octal Plug-in Computing Amplifiers GAP/R K2 Series, George A. Philbrick Researches, Inc., 230 Congress Street, Boston 10, Mass. (1956). On page 17 of this catalog an adder-subtractor circuit is described which combines the functions of relays 42 and 43. On page 16 subtractor and adder circuits are also described which could be employed separately for relays 42 and 43.

To better illustrate the advantages of our invention the following specific example is presented; however, the conditions therein should be interpreted as being typical and not to unduly restrict our invention.

EXAMPLE

Ethylene is polymerized in the presence of a chromium oxide catalyst at a temperature of 250° F. in a cyclohexane diluent. The reaction is continuous and variations in catalyst activity from time to time cause changes in production rate which cause a corresponding tendency for the temperature of the reaction to fluctuate. With an increase in catalyst activity the temperature of the reaction tends to increase above the desired value, 250° F., increasing for example to 251° F. This error in reactor temperature is transmitted to controller 41 which in turn manipulates the set point of controller 38 causing the solvent temperature to decrease from 220° F. to 218° F. Simultaneously a potential is produced in controller 44 which is proportional to the sum of the errors of both reactor temperature and solvent temperature and correspondingly the set point of controller 26 is manipulated to adjust the pressure on coolant in vessel 18 so that the coolant boils at a substantially lower temperature and removes more heat of reaction from the reactor. As the coolant removes more heat and the colder solvent is introduced, the reactor temperature quickly returns to normal, 250° F. This permits the solvent temperature to adjust upwardly, returning to its desired value of 220° F. and the total correction is thus made by changing coolant temperature.

It will be appreciated by those skilled in the art that our invention enables rapid adjustments in the temperature of a relatively large mass of reacting mixture. Basically the preferred aspect of our invention lies in controlling such a temperature by simultaneously manipulating two variables which affect this temperature. The more rapid (more sensitive) variable is forced to return to a mid-range value where it is again available for a corrective adjustment while the full temperature correction ultimately is made by the slower (less sensitive) variable.

As will be evident to those skilled in the art, various modifications of this invention can be made, or followed, in the light of the foregoing disclosure and discussion, without departing from the spirit or scope thereof. For example, our invention can be applied to fractionation processes such as the separation of ethylene from ethane. In such an application an analyzer recorder controller in response to an analysis for ethylene in a sample from the lower portion of the fractionator produces a signal representative of the error in actual ethylene content (B) from a desired set point (A), or $(A-B)$. This signal manipulates the set point of a flow recorder controller regulating the flow of heating fluid to the reboiler. The error of actual heating fluid flow rate (E) from desired heating fluid flow rate (D), or $(D-E)$, is added to the error $(A-B)$ to derive a signal which manipulates the set point of a flow recorder controller regulating the reflux rate at the top of the column. Since heating fluid rate is decreased in response to a decrease in ethylene in said sample and vice versa, the errors have the same sign and are additive, this being the opposite situation to that described in regard to reactor temperature control. Reflux rate is increased in order to increase both heating fluid rate and ethylene concentration to their desired values.

Another application of our invention is in controlling an ethylene cracking furnace where the conversion is maintained by first regulating the feed rate of cracking stock and second regulating the fuel rate to the burners to provide the total correction. In this situation, as in the fractionation process described above, the errors in conversion $(A-B)$ and cracking stock feed $(D-E)$ have the same sign and are additive. That is, when conversion goes down the cracking stock feed rate goes down in order to increase conversion. The fuel rate set point is manipulated by a signal derived from $(A-B+D-E)$ and is increased to increase both conversion and the cracking stock feed rate to their desired values.

We claim:

1. In a process wherein the temperature of a fluid mass is affected by the temperature of continuously added diluent and the temperature of a heat exchange medium in indirect heat exchange therewith, the improved method of controlling the temperature of said fluid mass which comprises sensing the temperatures of said fluid mass and said diluent, increasing the temperature of said diluent in response to a decrease in the temperature of said fluid mass and decreasing the temperature of said diluent in response to an increase in temperature of said fluid mass, producing a potential proportional to the sum of a given desired temperature for said fluid mass minus said temperature of said fluid mass plus said temperature of said diluent minus a given desired temperature for said diluent, and changing the temperature of said heat exchange medium in response and proportional to said potential.

2. In a continuous exothermic polymerization process conducted in a liquid reaction diluent the improved method of controlling the reaction zone temperature at a substantially constant desired value which comprises continuously adding diluent to said reaction zone, continuously passing boiling coolant in indirect heat exchange relationship with material in said reaction zone, sensing the temperature in said reaction zone, producing a first potential as a function of the deviation of said reaction zone temperature from its desired value, in response to said first potential increasing the temperature of said diluent when the reaction zone temperature decreases below its desired value and decreasing the diluent temperature when the reaction zone temperature increases above its desired value, sensing the temperature of said diluent, producing a second potential which is proportional to said desired reaction zone temperature minus reaction zone temperature plus said diluent temperature minus a desired value for said diluent temperature, and manipulating the pressure on said boiling coolant in response to said second potential by decreasing said pressure when said second potential is negative and increasing said pressure when said second potential is positive.

3. In a continuous, exothermic polymerization process conducted in a liquid reaction diluent the improved method of controlling the reaction zone temperature at a substantially constant value A which comprises continuously sensing the reaction zone temperature B, producing a control potential as a function of the deviation of B from A, passing cold diluent at a substantially constant flow rate in indirect heat exchange with steam thus warming said diluent, passing the thus warmed diluent to said reaction zone, sensing the temperature E of said diluent entering said reaction zone, varying the steam rate in heat exchange with said diluent in order to maintain temperature E near a set value, manipulating said set value in response to said control potential thereby increasing E in response to a decrease in B below A and decreasing E in response to an increase in B above A, producing a first potential proportional to $A-B$, producing a second potential proportional to $E-D$ where D is a desired value for the diluent entering said reaction zone, summing said first and second potentials to produce a third potential, passing boiling coolant in heat exchange relation with material in said reaction zone, varying the temperature of said coolant by varying the pressure thereon, and manipulating said pressure in response to said third potential to decrease said pressure by an amount proportional to a negative value of said third potential and to increase said pressure by an amount proportional to a positive value of said third potential.

4. The method of claim 3 wherein said process is the catalytic polymerization of ethylene.

5. In a polymerization system comprising a reactor, means for passing a coolant in indirect heat exchange with material in said reactor, means for varying the temperature of said coolant, conduit means for passing diluent into said reactor, and means for varying the temperature of said diluent, the improved control system comprising, in combination, first temperature sensing means in said conduit means, first control means connected to said first temperature sensing means and to said means for varying diluent temperature, second temperature sensing means in said reactor, second control means connected to said second temperature sensing means and to said first control means, means for producing a potential representative of the sum of the errors in reactor temperature B from a desired value A and in diluent temperature E from a desired value D as $(E-D+A-B)$ connected to said first and second temperature sensing means, and third control means connected to said means for producing a potential and to said means for varying coolant temperature.

6. In a polymerization system comprising a reactor, means for passing a boiling coolant in indirect heat exchange with material in said reactor, means for varying the pressure on said coolant, conduit means for passing diluent into said reactor, and means for heating diluent in said conduit means, the improved temperature control system comprising, in combination, first temperature sensing means in said conduit means downstream of said heating means, a first temperature controller operatively connected to said first temperature sensing means and to means for varying the heat supplied to said heating means, second temperature sensing means in said reactor, a second temperature controller operatively connected to said second temperature sensing means and to said first temperature controller for manipulating the set point of same, a first adding relay operatively connected to said second temperature sensing means for producing a first potential C representative of the error in reactor temperature $(A-B)$ where A is the desired reactor temperature and B is the actual reactor temperature, a second adding relay operatively connected to said first temperature sensing means and to said first adding relay to receive said first potential C, said second relay producing a second potential representative of the sum of said error in reactor temperature and the error in diluent temperature $(E-D)$ where D is the desired diluent temperature and E is the actual diluent temperature, and a controller operatively connected to said second adding relay to receive said second potential and to said means for varying the pressure on said coolant.

References Cited by the Examiner

UNITED STATES PATENTS

| | | | |
|---|---|---|---|
| 2,773,053 | 12/1956 | Field et al. | 260—94.9 |
| 2,808,316 | 10/1957 | Hall | 23—252 |
| 2,825,721 | 3/1958 | Hogan et al. | 260—88.1 |
| 2,908,734 | 10/1959 | Cottle | 260—683.15 |
| 2,974,017 | 3/1961 | Morgan | 23—253 |
| 3,074,919 | 1/1963 | Mellow | 260—94.9 |

OTHER REFERENCES

Perry: Chemical Engineer's Handbook, 3d edition, p. 293.

JOSEPH L. SCHOFER, *Primary Examiner.*

LESLIE H. GASTON, MORRIS LIEBMAN, JOSEPH R. LIEBERMAN, WILLIAM H. SHORT, *Examiners.*